United States Patent
Kobayashi

(10) Patent No.: US 8,160,131 B2
(45) Date of Patent: Apr. 17, 2012

(54) APPARATUS AND METHOD FOR PROCESSING IMAGE

(75) Inventor: Satoru Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1183 days.

(21) Appl. No.: 11/942,867

(22) Filed: Nov. 20, 2007

(65) Prior Publication Data

US 2008/0123735 A1 May 29, 2008

(30) Foreign Application Priority Data

Nov. 28, 2006 (JP) ................................. 2006-319624

(51) Int. Cl.
*H04N 7/12* (2006.01)
(52) U.S. Cl. ................................. 375/240.01
(58) Field of Classification Search ............. 375/240.29; 348/383.1–440.1
See application file for complete search history.

(56) References Cited

U.S. PATENT DOCUMENTS

| 2004/0114912 A1* | 6/2004 | Okamoto et al. | 386/114 |
| 2005/0212977 A1* | 9/2005 | Zhu et al. | 348/725 |
| 2006/0001779 A1* | 1/2006 | Favrat et al. | 348/725 |
| 2009/0115903 A1* | 5/2009 | Zhu et al. | 348/572 |

FOREIGN PATENT DOCUMENTS

JP 2002-232889 A 8/2002

* cited by examiner

*Primary Examiner* — Chirag Shah
*Assistant Examiner* — Jenkey Van
(74) *Attorney, Agent, or Firm* — Canon USA Inc. IP Division

(57) ABSTRACT

An image processing apparatus includes a decoding unit configured to decode coded image data; a filtering unit configured to filter the image data; an analog-image output unit configured to convert the image data into analog signals and output the analog signals in an analog manner; a digital-image output unit configured to output the image data in a digital manner; an output determination unit configured to select the analog-image output unit or the digital-image output unit for outputting the image data to an external device; and a filter control unit configured to switch a characteristic of a filter used in a filtering unit in accordance with the selection made by the output determination unit.

10 Claims, 8 Drawing Sheets

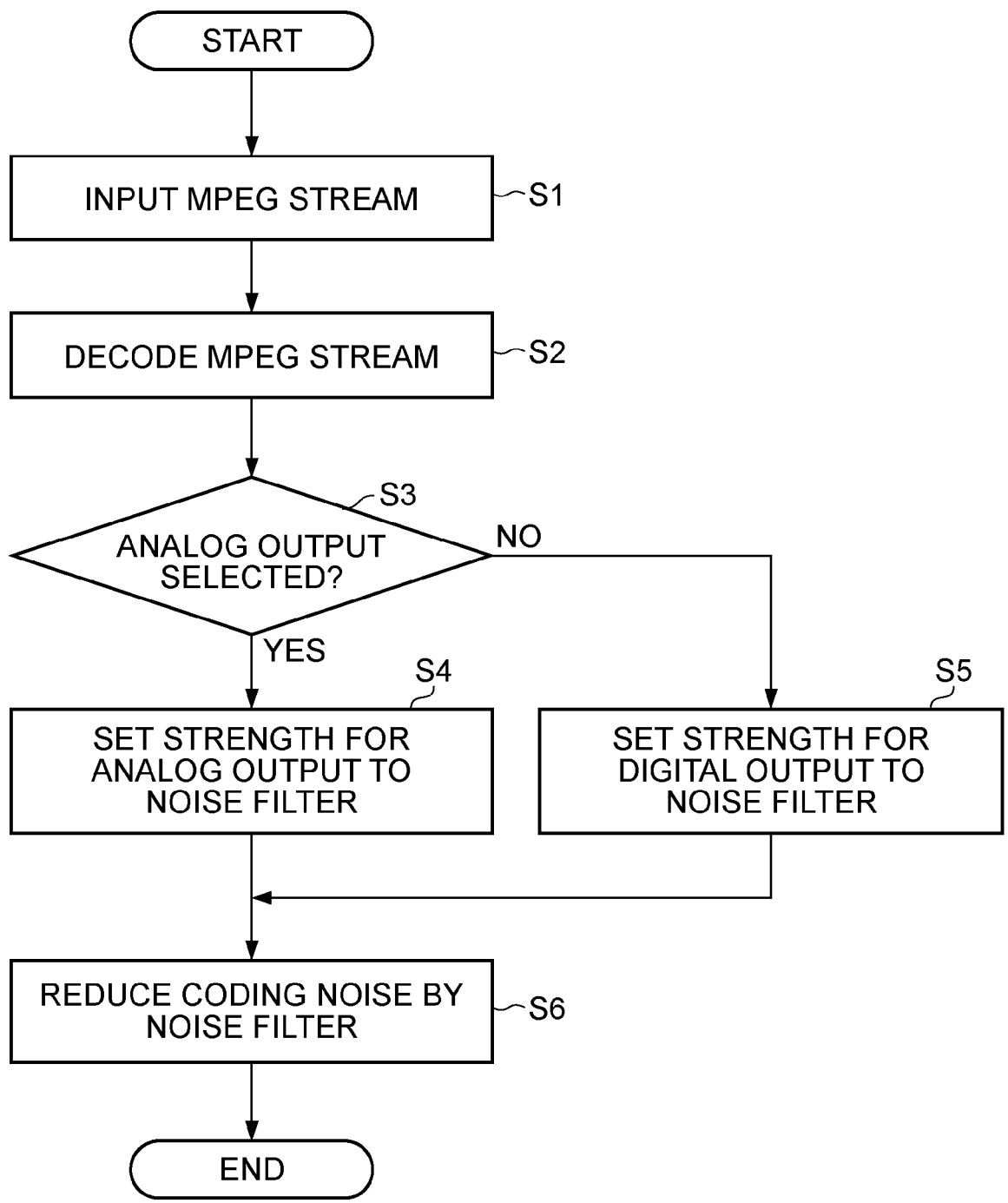

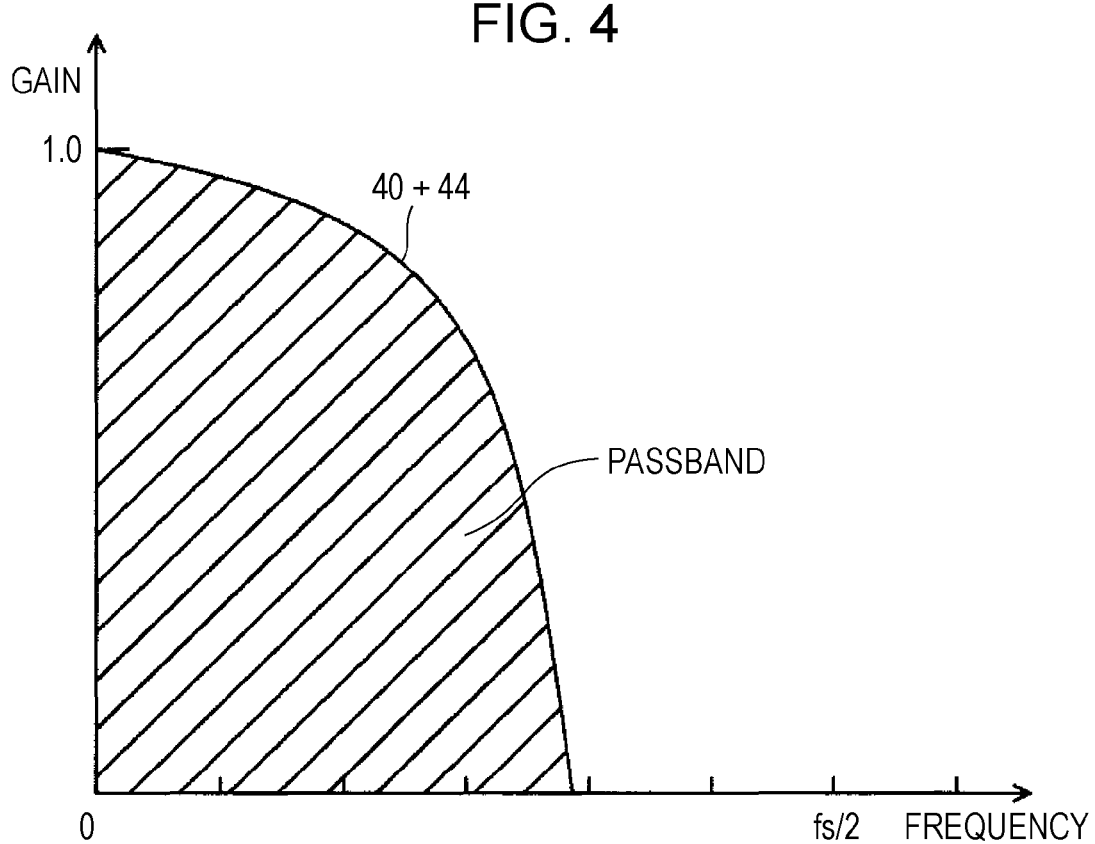
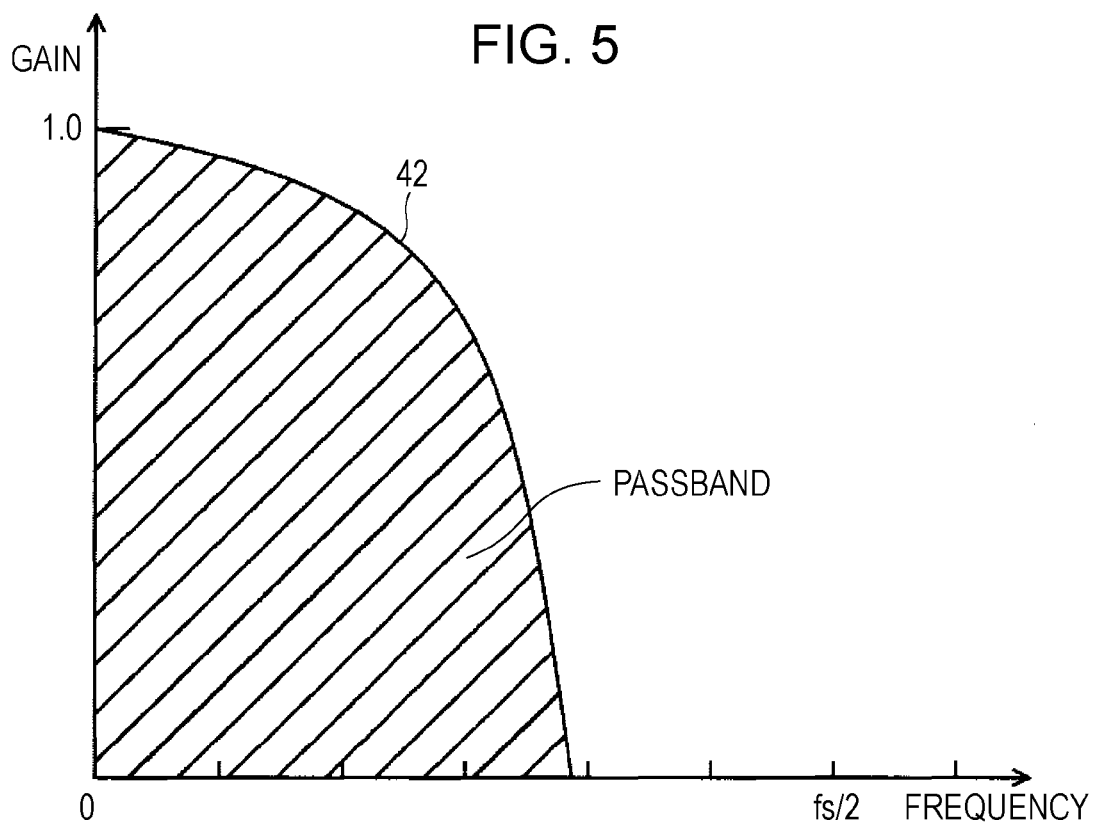

APPARATUS AND METHOD FOR PROCESSING IMAGE

BACKGROUND OF THE INVENTION

1. Field of the Invention

The present invention relates to apparatuses and methods for processing images for decoding coded video information and outputting the information as analog baseband signals or digital baseband signals.

2. Description of the Related Art

Image pickup apparatuses such as digital video cameras mainly adopt Moving Picture Experts Group (MPEG) 2 as a coding method. Moreover, a large number of image recording apparatuses and image reproducing apparatuses support the MPEG-2 coding.

In the MPEG-2 coding, in general, quantization errors and the like cause more coding noise in reproduced images as the compression rate of the images is increased, resulting in degradation in image quality. Typical coding noise includes mosquito noise and block noise as high-frequency noise generated in high-frequency regions. In order to remove such coding noise and improve the quality of reproduced images, decoded images are filtered using low-pass filters (coding-noise reduction filter) in some technologies (for example, see Japanese Patent Laid-Open No. 2002-232889).

On the other hand, when image pickup apparatuses, Digital Versatile Disc (DVD) players, or the like are used as image output apparatuses and connected to image display apparatuses such that images are reproduced and displayed, the image output apparatuses and the image display apparatuses are connected to each other via S-terminal connectors, D-terminal connectors, or the like. In general, the image output apparatuses convert digital video signals into analog video signals, and output analog baseband signals to the image display apparatuses.

Recently, connection interfaces typified by High-Definition Multimedia Interface (HDMI) capable of transmitting digital baseband signals in addition to the analog baseband signals have been in widespread use.

FIG. 6 is a block diagram schematically illustrating a configuration of an image processing apparatus that decodes coded video information and outputs analog baseband signals or digital baseband signals. The structure and operations of an image processing apparatus 110 will now be described with reference to FIG. 6.

Video signals (a so-called MPEG stream) compressed and coded using the MPEG-2 coding method are input to an MPEG decoding unit 114 via an input terminal 112. The MPEG decoding unit 114 reconstructs image signals in each frame or each field by decoding the compressed and coded video signals from the input terminal 112.

A filter-strength determination section 118 in a noise reduction unit 116 determines the strength of a noise filter 120. The filter strength indicates, for example, the cutoff frequency of the noise filter 120. The noise filter 120 is, for example, a spatial low-pass filter (LPF) used for digital processing, and removes or reduces coding noise in the video signals output from the MPEG decoding unit 114 using the fixed filter strength specified by the filter-strength determination section 118.

An output-format determination unit 124 operates a switch 122 in response to, for example, a selection instruction issued by a user.

The switch 122 outputs the video signals passed through the noise filter 120 to a digital encoder 126 or a National Television System Committee (NTSC) encoder 130.

When digital baseband signals are output, the digital encoder 126 converts the digital image data output from the noise filter 120 into digital baseband signals, and outputs the signals to an output terminal 128. The digital baseband signals are output from the output terminal 128 to an external device.

On the other hand, when analog baseband signals are output, the NTSC encoder 130 converts the digital image data output from the noise filter 120 into digital baseband signals in the NTSC format. Subsequently, a D/A converter 132 converts the digital signals output from the NTSC encoder 130 into analog signals, and supplies the signals to an anti-aliasing filter (AAF) 134. The AAF 134 performs anti-aliasing on the analog signals output from the D/A converter 132 so as to remove high-frequency components. The analog baseband signals processed by the AAF 134 are output from an output terminal 136 to an external device.

In this manner, high-frequency components need to be removed from the analog baseband signals such that aliasing is prevented. The application of the anti-aliasing filter causes differences in the degree of the coding noise generated in the digital baseband signals and the analog baseband signals. When the AAF 134 has an ideal frequency response whose gain at a frequency lower than or equal to the cutoff frequency is 1.0 and whose gain at a frequency higher than the cutoff frequency is zero with respect to a sampling frequency fs, the bandwidth of the output digital baseband signals corresponds to that of the output analog baseband signals. However, it is impossible to realize an anti-aliasing filter having such an ideal frequency response.

FIG. 7 illustrates a spectrum of digital image signals output from the MPEG decoding unit 114. As shown in FIG. 7, the digital image signals output from the MPEG decoding unit 114 include components repeatedly appearing at each sampling frequency fs. FIG. 8 illustrates an ideal frequency response of an anti-aliasing filter applied to analog signals into which digital signals including such cyclic components are converted. As shown in FIG. 8, the gain at frequencies from a direct-current frequency to the cutoff frequency fs/2 is 1.0, and the gain at frequencies higher than or equal to the cutoff frequency fs/2 is zero. That is, the frequency response completely removes components whose frequencies are higher than or equal to the cutoff frequency fs/2.

In order to achieve such an ideal cutoff characteristic, the number of taps needs to be infinite. However, that is impractical. As shown in FIG. 9, an anti-aliasing filter with a finite number of taps has a frequency response whose gain is gently reduced from a frequency immediately lower than the cutoff frequency fs/2. When the AAF 134 has the frequency response shown in FIG. 9, the passband of the analog baseband signals output from the AAF 134 corresponds to a portion indicated by a hatched area shown in FIG. 10. That is, the gain at a frequency immediately lower than the cutoff frequency fs/2 is smaller than the original value, and furthermore, the gain is reduced as the frequency approaches the cutoff frequency fs/2.

When the noise filter 120 for reducing the coding noise is disposed upstream of the AAF 134 as shown in FIG. 6, the spectral characteristic of the analog baseband signals output from the AAF 134 corresponds to that obtained by overlapping the frequency response of the noise filter 120 with that of the AAF 134. FIG. 11 illustrates the frequency response 150 of the noise filter 120, the frequency response 152 of the AAF 134, and a frequency response 154 obtained by synthesizing the frequency responses 150 and 152. The abscissa represents the frequency, and the ordinate represents the gain.

The noise filter 120 and the AAF 134 are applied to the analog baseband signals. That is, the frequency response 154 obtained by synthesizing the frequency response 150 of the noise filter 120 and the frequency response 152 of the AAF 134 is applied to the analog baseband signals. A hatched area shown in FIG. 12 (inner zone of the frequency response 154 shown in FIG. 11) corresponds to the passband of the output analog baseband signals.

On the other hand, a hatched area shown in FIG. 13 (inner zone of the frequency response 150 shown in FIG. 11) corresponds to the passband of the output digital baseband signals since only the noise filter 120 is applied to the digital baseband signals. That is, the passband of the digital baseband signals is wider than that of the analog baseband signals. Herein, the frequency response of the transfer function of the digital encoder 126 is regarded as being flat.

As described above, the strength of the noise filter for reducing the coding noise is set to the same value when either analog or digital images are output in the known method for removing noise. Therefore, the output bands of the analog baseband signals and the digital baseband signals differ from each other due to the effects of the anti-aliasing filter. This leads to differences in the degree of noise in reproduced images.

SUMMARY OF THE INVENTION

The present invention is directed to an apparatus and a method for processing images in which the degree of coding noise generated in output digital images can be substantially the same level as that generated in output analog images.

According to an aspect of the present invention, an image processing apparatus includes a decoding unit configured to decode coded image data; a filtering unit configured to filter the image data; an analog-image output unit configured to convert the image data into analog signals and output the analog signals in an analog manner; a digital-image output unit configured to output the image data in a digital manner; an output determination unit configured to select the analog-image output unit or the digital-image output unit for outputting the image data to an external device; and a filter control unit configured to switch a characteristic of a filter used in a filtering unit in accordance with the selection made by the output determination unit.

According to another aspect of the present invention, a method for processing images includes decoding coded image data; selecting whether the image data is output as digital image data or analog image signals; coding-noise reducing during which the image data is filtered using a frequency response for digital output when the image data is output as the digital image data, and the image data is filtered using a frequency response for analog output when the image data is output as the analog image signals; analog-image outputting during which the image data is converted into analog signals and output in an analog manner when the image data is output as the analog image signals; and digital-image outputting during which the image data is output in a digital manner when the image data is output as the digital image data.

Further features and aspects of the present invention will become apparent from the following detailed description of exemplary embodiments with reference to the attached drawings.

BRIEF DESCRIPTION OF THE DRAWINGS

FIG. 3 is a flow chart illustrating operations of a noise reduction unit.

FIG. 4 is a schematic view illustrating a passband for analog output.

FIG. 5 is a schematic view illustrating a passband for digital output.

DESCRIPTION OF THE EMBODIMENTS

Numerous exemplary embodiments, features and aspects of the present invention will now be described with reference to the drawings.

First Exemplary Embodiment

Figure 1:
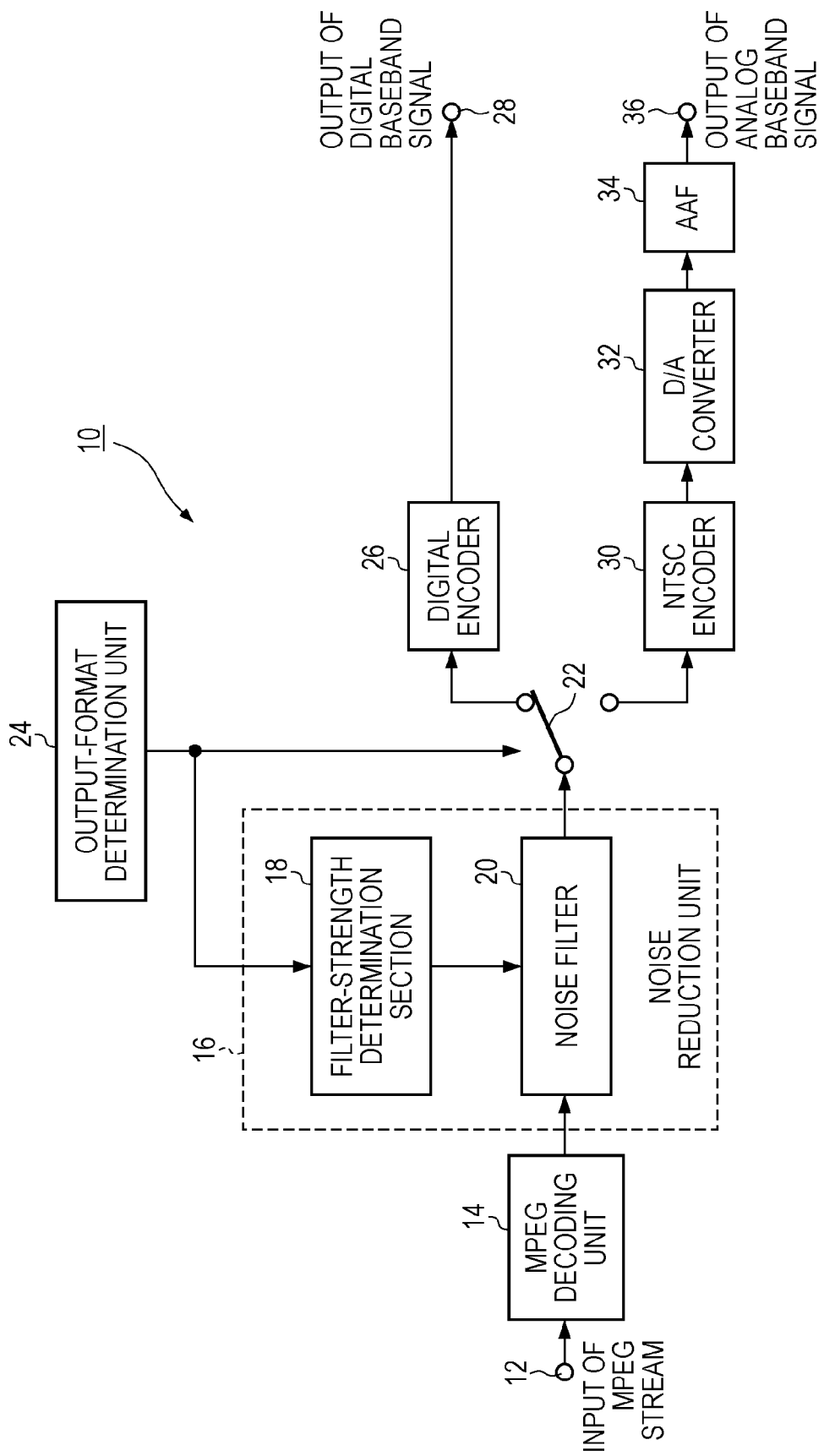
FIG. 1 is a block diagram illustrating an exemplary configuration of an image processing apparatus according to an exemplary embodiment of the present invention.

FIG. 1 is a block diagram illustrating an exemplary configuration of an image processing apparatus according to an exemplary embodiment of the present invention. An image processing apparatus 10 shown in FIG. 1 decodes coded video information, and selectively outputs analog baseband signals and digital baseband signals of the decoded video information. The image processing apparatus 10 includes an input terminal 12, an MPEG decoding unit 14, a noise reduction unit 16, a switch (or selector) 22, an output-format determination unit 24, a digital encoder 26, an output terminal 28 such as HDMI for outputting digital baseband signals, an NTSC encoder 30, a D/A converter 32, an AAF 34, and an output terminal 36 for outputting analog baseband signals. Moreover, the noise reduction unit 16 includes a noise filter 20 and a filter-strength determination section 18 that is controlled by the output-format determination unit 24 and sets the strength of the noise filter 20.

For example, video data compressed and coded using the MPEG-2 coding method (a so-called video stream) is input from an apparatus, a storage medium, or a transmission path (not shown) to the input terminal 12. The MPEG decoding unit 14 reconstructs image signals in each frame or each field by decoding the compressed and coded video data from the input terminal 12 using MPEG decoding such as dequantizing and inverse DCT.

When a signal output from the output-format determination unit 24 indicates that analog output is selected, the filter-strength determination section 18 sets the strength for analog output to the noise filter 20, the strength having a passband reaching high frequencies. On the other hand, when digital output is selected, the filter-strength determination section 18 sets the strength for digital output to the noise filter 20, the strength having a passband not reaching high frequencies as compared with that for analog output. The noise filter 20 is, for example, a LPF used for digital processing, and removes or reduces coding noise in the video data output from the MPEG decoding unit 14 using the filter strength set by the filter-strength determination section 18. Herein, setting the filter strength mainly corresponds to specifying the cutoff frequency of the noise filter 20, and, for example, the cutoff frequency is reduced as the filter strength is increased. That is, setting the filter strength corresponds to setting the strength of coding-noise reduction. The filter-strength determination section 18 can be regarded as a controller for switching the frequency response of the noise filter 20.

The output-format determination unit 24 includes, for example, a connection detecting mechanism that detects the presence of video cables (not shown) connected to the output terminal 28 for digital baseband signals and to the output terminal 36 for analog baseband signals. The output-format determination unit 24 connects the switch 22 to the side of the output terminal 28 or the side of the output terminal 36 in accordance with the detected connection state of the video cables. That is, the output-format determination unit 24 selects digital output or analog output. When both the output terminals 28 and 36 are connected to video cables, the switch 22 is connected to the one that is specified in advance. Herein, the switch 22 is connected to the side of the output terminal 28 on a priority basis. The output format can be selected in response to a selection instruction issued by a user regardless of the connection state of the video cables.

The switch 22 outputs the digital image data passed through the noise filter 20 to the digital encoder 26 or the NTSC encoder 30 in accordance with the signal indicating the output format output from the output-format determination unit 24. The image data is output to the digital encoder 26 when digital output is selected, whereas the image data is output to the NTSC encoder 30 when analog output is selected.

In the case where the switch 22 is switched in accordance with the connection state of video cables, the output-format determination unit 24 connects the switch 22 to the digital encoder 26 when it is detected that a video cable is connected to the output terminal 28. On the other hand, the output-format determination unit 24 connects the switch 22 to the NTSC encoder 30 when it is detected that a video cable is connected to the output terminal 36 and no video cable is connected to the output terminal 28.

When digital baseband signals are output, the digital encoder 26 converts the digital image data output from the noise filter 20 into digital baseband signals, and outputs the signals to the output terminal 28. The digital baseband signals are output from the output terminal 28 to an external device. On the other hand, when analog baseband signals are output, the NTSC encoder 30 converts the digital image data output from the noise filter 20 into digital baseband signals in the NTSC format. Subsequently, the D/A converter 32 converts the digital signals output from the NTSC encoder 30 into analog signals, and supplies the signals to the AAF 34. The AAF 34 performs anti-aliasing on the analog signals output from the D/A converter 32 so as to remove high-frequency components. The analog baseband signals processed using the AAF 34 are output from the output terminal 36 to an external device.

Figure 2:
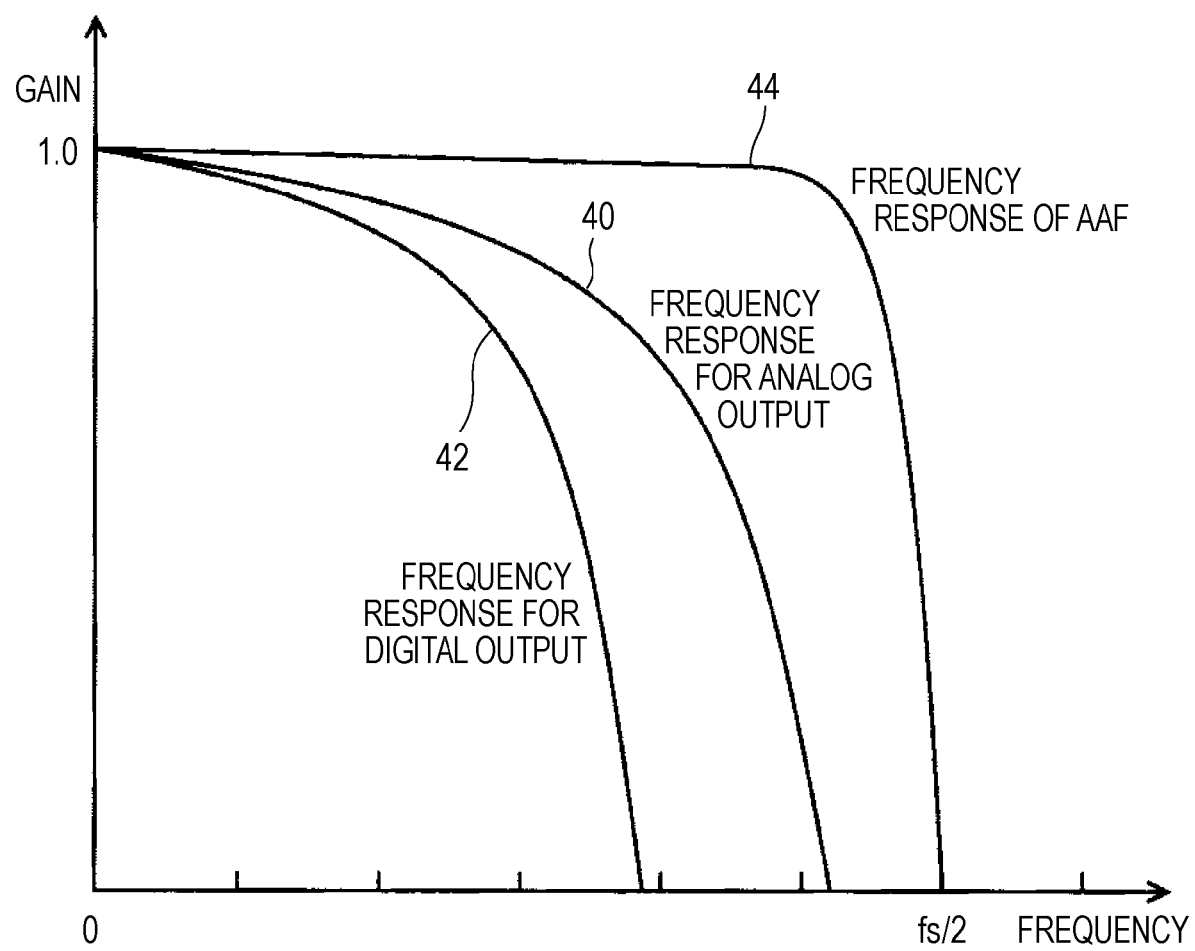
FIG. 2 illustrates the frequency responses of a noise filter and an anti-aliasing filter.
Figure 6:
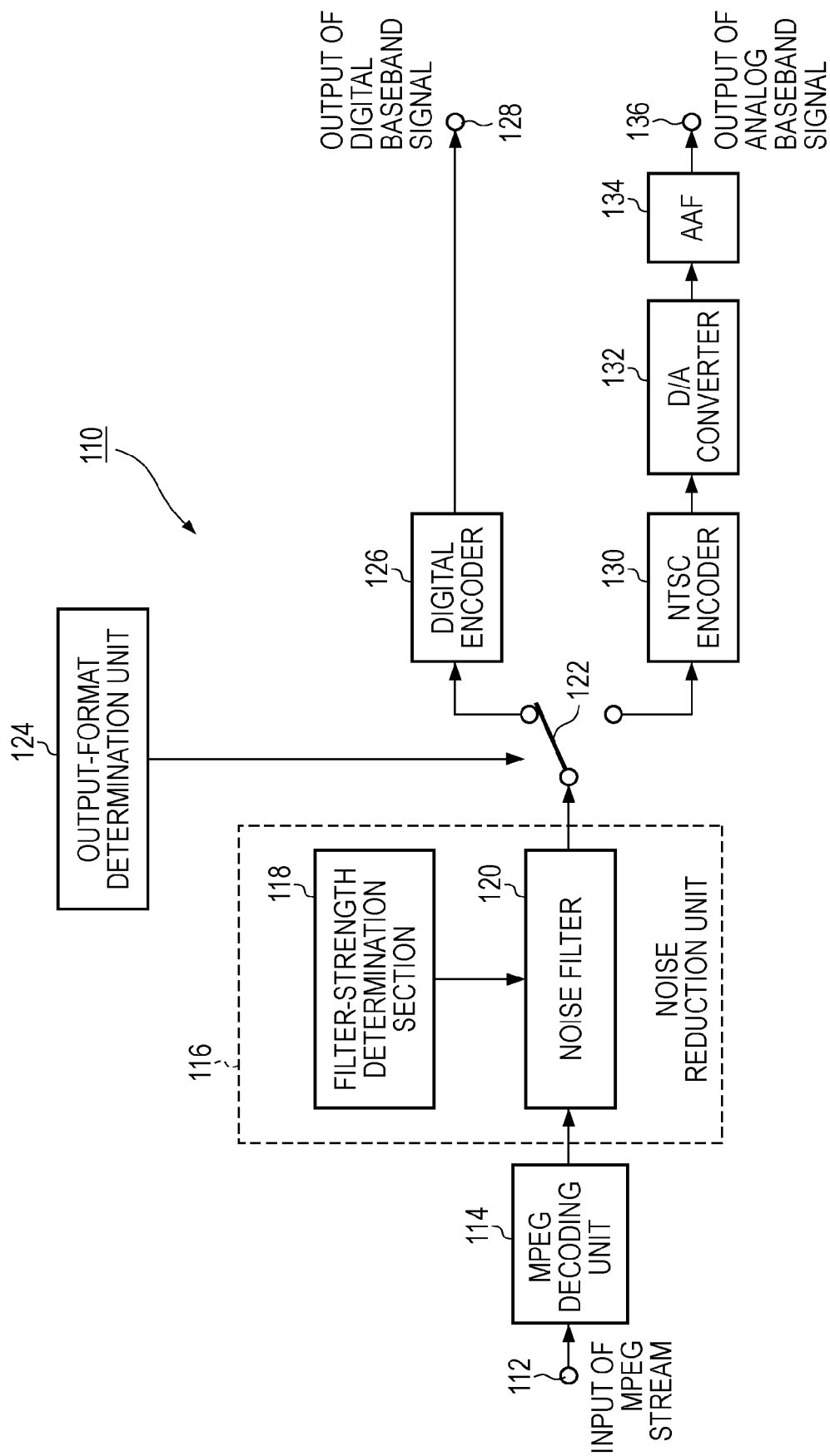
FIG. 6 is a block diagram illustrating a configuration of an image processing apparatus.
Figure 7:
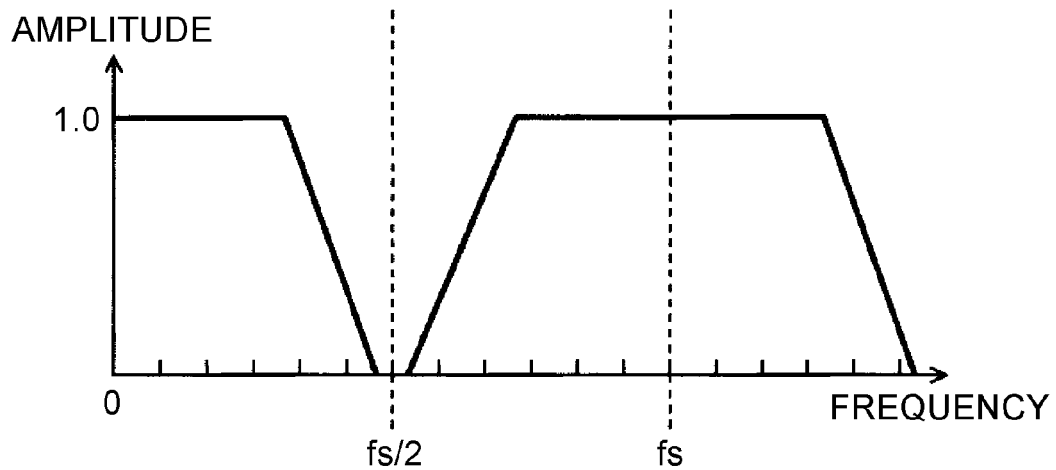
FIG. 7 illustrates a spectrum of digital image signals.
Figure 8:
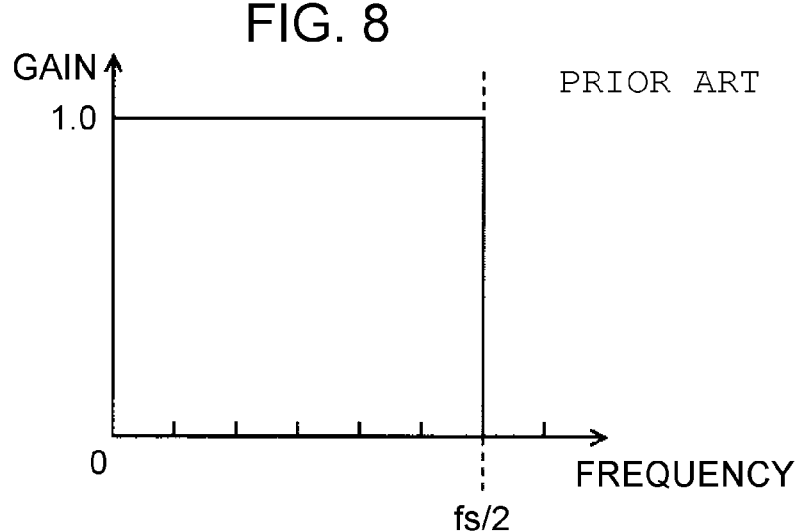
FIG. 8 illustrates an ideal frequency response of an anti-aliasing filter.
Figure 9:
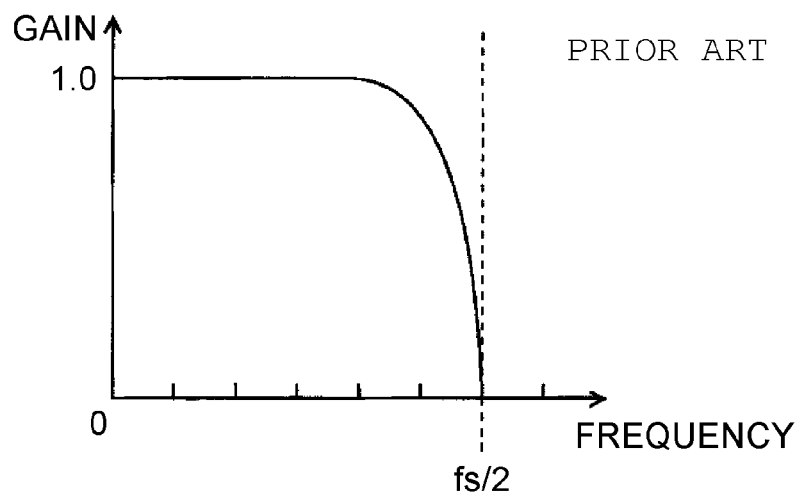
FIG. 9 illustrates a practical frequency response of the anti-aliasing filter.
Figure 10:
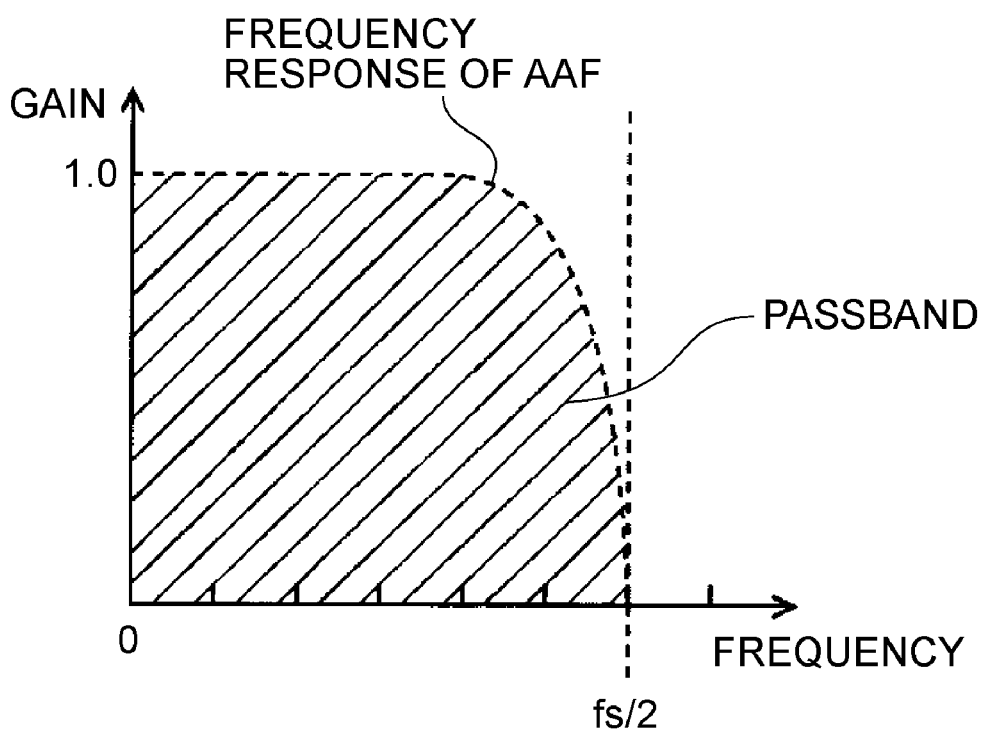
FIG. 10 is a schematic view of a passband of analog baseband signals output from the anti-aliasing filter having the frequency response shown in FIG. 9.
Figure 11:
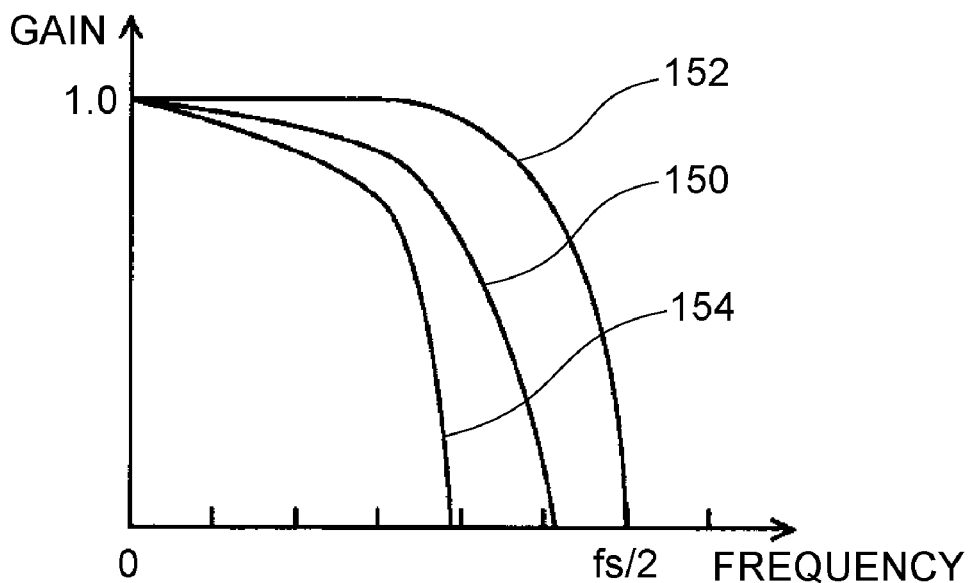
FIG. 11 illustrates a frequency response of a noise filter, a frequency response of an anti-aliasing filter, and a frequency response obtained by synthesizing the above-described frequency responses.
Figure 12:
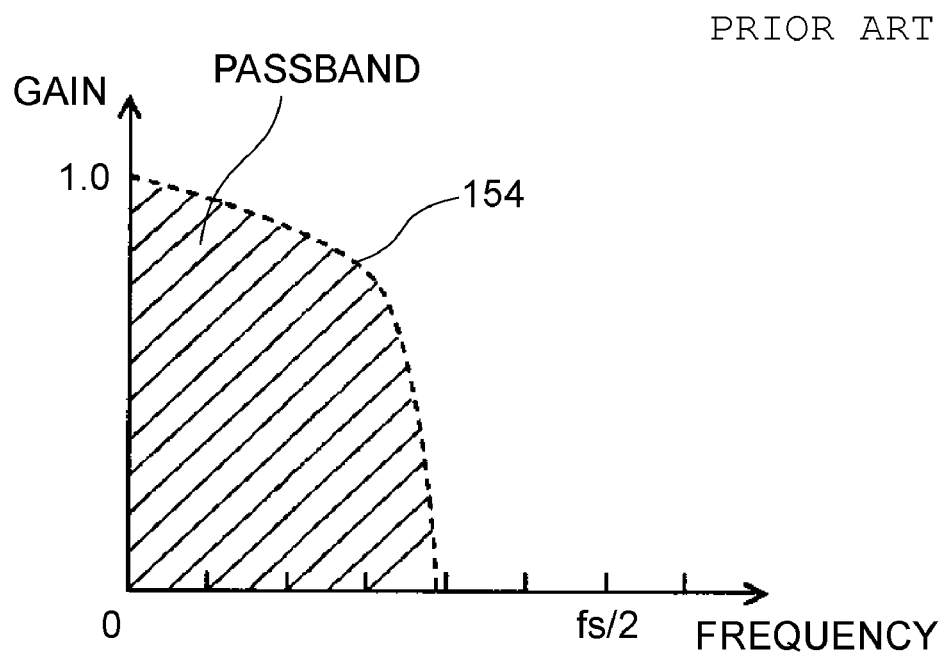
FIG. 12 is a schematic view illustrating a passband for analog baseband signals.
Figure 13:
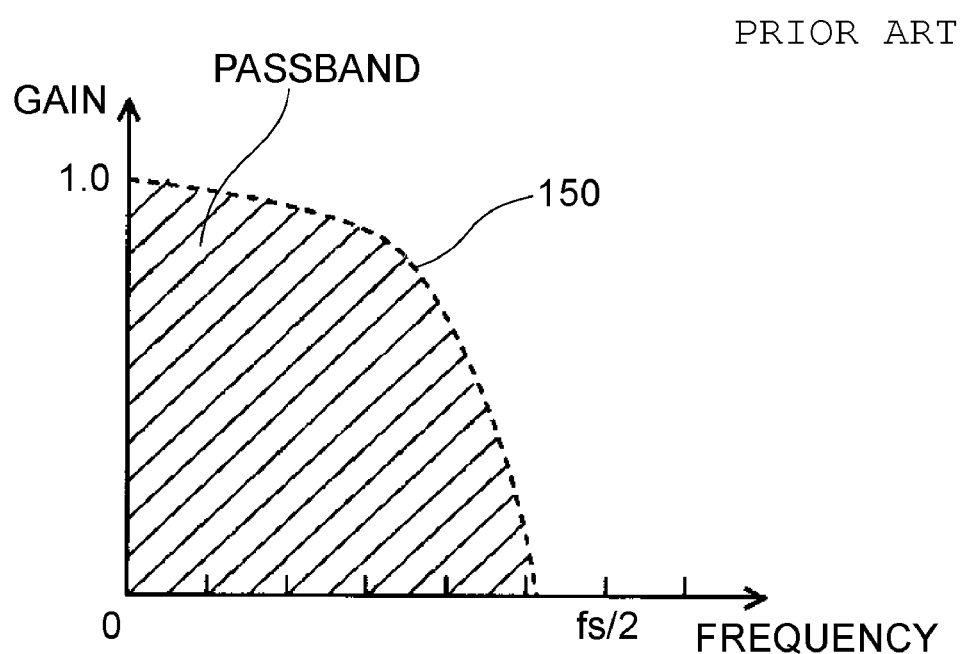
FIG. 13 is a schematic view illustrating a passband for digital baseband signals.

FIG. 2 illustrates the frequency responses of the noise filter 20 and the AAF 34. Reference numbers 40 and 42 denote the frequency responses for analog output and digital output, respectively, of the noise filter 20. Reference number 44 denotes the frequency response of the AAF 34.

In this exemplary embodiment, the frequency responses 40 and 42 are set to the noise filter 20 by the output-format determination unit 24 and the filter-strength determination section 18 such that the frequency response 42 corresponds to a frequency response obtained from the product of the frequency response 40 and the frequency response 44 of the AAF 34. Therefore, as shown in FIG. 2, the passband of the frequency response 42 for digital output is narrower than that of the frequency response 40 for analog output.

FIG. 3 is a flow chart illustrating operations of the noise reduction unit 16. First, an MPEG stream is input to the MPEG decoding unit 14 via the input terminal 12 (Step S1). The MPEG decoding unit 14 decodes the MPEG stream, and outputs uncompressed digital image data (Step S2). At this moment, analog output or digital output has been already selected by the output-format determination unit 24 using the above-described method.

Next, it is determined whether or not analog output is selected by the output-format determination unit 24 (Step S3). When analog output is selected (Yes in Step S3), the filter-strength determination section 18 sets the strength for analog output (frequency response 40 shown in FIG. 2) to the noise filter 20 (Step S4). On the other hand, when digital output is selected (No in Step S3), the filter-strength determination section 18 sets the strength for digital output (frequency response 42 shown in FIG. 2) to the noise filter 20 (Step S5).

The noise filter 20 operates using the frequency response corresponding to the set filter strength, and filters the digital image data output from the MPEG decoding unit 14. That is, the noise filter 20 reduces coding noise (Step S6).

In the case of analog output, the frequency response 40 of the noise filter 20 and the frequency response 44 of the AAF 34 are applied to the image data decoded by the MPEG decoding unit 14. The hatched area (inner zone of the frequency response obtained by applying both the frequency responses 40 and 44) shown in FIG. 4 is the resultant passband. On the other hand, in the case of digital output, the frequency response 42 of the noise filter 20 is applied to the image data decoded by the MPEG decoding unit 14. The hatched area (inner zone of the frequency response 42) shown in FIG. 5 is the resultant passband. This passband is substantially equal to that shown in FIG. 4. Since the frequency response 42 for digital output is set so as to correspond to the frequency response obtained by applying both the frequency responses 40 and 44, the passband for outputting analog baseband signals and that for outputting digital baseband signals become substantially the same. Thus, the degree of coding noise generated in both cases becomes substantially the same.

In this exemplary embodiment, MPEG coding is described as an example. However, the coding method is not limited to this, and other coding methods such as Digital Video (DV) coding and H.264 (Advanced Video Coding; AVC) coding can be used. H.264 (AVC) coding is described in ITU-T H.264 standard and MPEG-4 Part 10 standard (ISO/IEC 14496-10) in detail.

In this exemplary embodiment, the output-format determination unit 24 includes a mechanism that detects the presence of video cables connected to the output terminals. In addition, the output-format determination unit 24 can include components such as menus and buttons with which users can manually select output signals. Furthermore, the output-format determination unit 24 can be controlled by a remote controller. In the case of a structure where digital baseband signals and analog baseband signals can be simultaneously output, the switch 22 can be connected to both output terminals, and at the same time, a plurality of noise filters 20 can be used for parallel processing. At this moment, the filter-strength determination section 18 sets the frequency response 42 to the noise filter for digital output, and sets the frequency response 40 to the noise filter for analog output. With this, the same decoded images can be simultaneously output in the analog manner and in the digital manner, and at the same time, the degree of noise generated in both cases can be substantially the same level.

Other Exemplary Embodiments

Program codes of software for achieving the functions according to the above-described exemplary embodiment can be supplied to computers in apparatuses or systems connected to various devices so that the devices can operate so as to achieve the functions according to the above-described exemplary embodiment. The program codes executed by operating the devices in accordance with programs stored in the computers (CPUs or MPUs) in the apparatuses or the systems are also included in the scope of the present invention.

In this case, the program codes of the software achieve the functions according to the above-described exemplary embodiment. Moreover, the program codes and units for supplying the program codes to the computers, for example, storage media in which the program codes are stored are included in the present invention. The storage media for storing the program codes include, for example, flexible disks, hard disks, optical disks, magneto-optical disks, CD-ROMs, magnetic tapes, nonvolatile memory cards, and ROMs.

The functions according to the above-described exemplary embodiment can be achieved by executing the program codes supplied to the computer. In addition, the functions according to the above-described exemplary embodiment can also be achieved by executing the program codes in conjunction with operating systems (OSs), other application software, or the like working on the computers. In such a case, the program codes are also included in the exemplary embodiments of the present invention.

After the program codes are stored in memories provided for function expansion boards in the computers, CPUs or the like provided for the function expansion boards execute a part of or all the actual processes in response to instructions of the program codes. The processes that achieve the functions according to the above-described exemplary embodiment are also included in the present invention. Furthermore, after the program codes are stored in memories provided for function expansion boards connected to the computers, CPUs or the like provided for the function expansion boards execute a part of or all the actual processes in response to instructions of the program codes. The processes that achieve the functions according to the above-described exemplary embodiment are also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2006-319624 filed Nov. 28, 2006, which is hereby incorporated by reference herein in its entirety.

What is claimed is:

1. An image processing apparatus, comprising:
   a decoding unit configured to decode coded image data into image data;
   a filtering unit configured to filter the image data by using a first noise filter by digital processing;
   an analog-image output unit configured to convert the image data into analog signals and output the analog signals in an analog manner;
   a digital-image output unit configured to output the image data in a digital manner;
   an output determination unit configured to select the analog-image output unit or the digital-image output unit for outputting the image data to an external device; and
   a filter control unit configured to switch a characteristic of the first noise filter used in the filtering unit in accordance with the selection made by the output determination unit,
   wherein the analog-image output unit includes a second noise filter to filter the analog signals by analog processing, and
   the filter control unit controls the characteristic of the first noise filter so that a passband of the image data which have been filtered by the first noise filter, to be output from the digital-image output unit, and a passband of the analog signals which have been filtered by the first noise filter and the second noise filter respectively, to be output from the analog-image output unit, become substantially equal.

2. The image processing apparatus according to claim 1, wherein the filtering unit includes a filter for coding-noise reduction as the first noise filter.

3. The image processing apparatus according to claim 2, wherein the filter control unit switches a filter strength used in the coding-noise reduction in accordance with the selection made by the output determination unit.

4. The image processing apparatus according to claim 1, wherein the filter control unit reduces a passband of the image data by the first noise filter used when the digital-image output unit is selected by the output determination unit as compared with a passband of the image data by the first noise filter used when the analog-image output unit is selected.

5. The image processing apparatus according to claim 1, wherein the analog-image output unit includes a digital-to-analog (D/A) converter configured to convert the image data into the analog signals and a low-pass filter as the second noise filter configured to filter the analog signals output from the D/A converter.

6. The image processing apparatus according to claim 5, wherein the low-pass filter is an anti-aliasing filter.

7. The image processing apparatus according to claim 5, wherein the filter control unit sets a frequency response of the first noise filter used in the filtering unit when the digital-image output unit is selected and a frequency response of the first noise filter used in the filtering unit when the analog-image output unit is selected on the basis of a frequency response of the low-pass filter.

8. The image processing apparatus according to claim 7, wherein the filter control unit sets a frequency response obtained from the product of the frequency response of the low-pass filter and the frequency response of the first noise filter used in the filtering unit when the analog-image output unit is selected to be equal to the frequency response of the first noise filter used in the filtering unit when the digital-image output unit is selected.

9. A method for processing images, comprising:
   decoding coded image data into image data;
   selecting whether the image data is output as digital image data or analog image signals;
   coding-noise reducing by using a first noise filter by digital processing, during which the image data is filtered using a frequency response for digital output when the image data is output as the digital image data, and the image data is filtered using a frequency response for analog output when the image data is output as the analog image signals;

analog-image outputting during which the image data is converted into analog signals, filtered by using a second noise filter by analog processing and output in an analog manner when the image data is output as the analog image signals;

digital-image outputting during which the image data is output in a digital manner when the image data is output as the digital image data; and controlling a frequency response of the first noise filter so that a passband of the digital image data which have been filtered by the first noise filter and a passband of the analog image signals which have been filtered by the first noise filter and the second noise filter respectively become substantially equal.

10. A non-transitory storage medium comprising:
a program configured to drive a computer to execute steps for processing images, the steps including:
  decoding coded image data into image data;
  selecting whether the image data is output as digital image data or analog image signals;
  coding-noise reducing by using a first noise filter by digital processing, during which the image data is filtered using a frequency response for digital output when the image data is output as the digital image data, and the image data is filtered using a frequency response for analog output when the image data is output as the analog image signals;
  analog-image outputting during which the image data is converted into analog signals, filtered by using a second noise filter by analog processing and output in an analog manner when the image data is output as the analog image signals;
  digital-image outputting during which the image data is output in a digital manner when the image data is output as the digital image data; and
  controlling a frequency response of the first noise filter so that a passband of the digital image data which have been filtered by the first noise filter and a passband of the analog image signals which have been filtered by the first noise filter and the second noise filter respectively become substantially equal.

* * * * *